United States Patent Office

3,176,030
Patented Mar. 30, 1965

3,176,030
16α - LOWERHYDROCARBON - ANDROSTEN - 16β-OL - 3 - ONE AND 16α - LOWERHYDROCARBON-ANDROSTEN-16β-OL-3-OL COMPOUNDS
Max N. Huffman, Colorado Springs, Colo., assignor to Lasdon Foundation, Inc., Yonkers, N.Y., a corporation of Delaware
No Drawing. Filed Oct. 16, 1963, Ser. No. 316,515
13 Claims. (Cl. 260—397.4)

This invention relates to novel androstane compounds and to the production thereof. More particularly, it relates to androstane compounds of the following general formula and to lower alkanoic acid esters thereof:

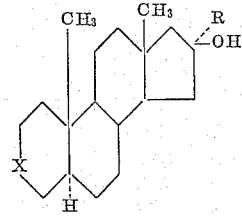

wherein X is a carbonyl or hydroxymethylene radical and R is a lower hydrocarbon radical containing 1 to 5 carbon atoms.

In the compounds of the general structural formula set forth above, X represents a carbonyl radical (—CO—) or a hydroxymethylene radical (—CHOH—), preferably a β-hydroxymethylene radical. The radical represented by R is a lower hydrocarbon radical such as a lower alkyl radical, for example methyl, ethyl, propyl, butyl or amyl, or a lower alkenyl radical, for example, allyl, methallyl or crotyl, or a lower alkynyl radical, for example ethynyl or propargyl.

The compounds illustrated by the structural formula above can also be obtained in the form of esters with lower alkanoic acids such as acetic, propionic, butyric and related alkanoic acids containing 1 to 6 carbon atoms.

The compounds of this invention are useful in the prevention and suppression of schizophrenic behavior induced in mammals by lysergic acid diethylamide (LSD). The peculiar psychic action of LSD was discovered by A. Hofmann and W. A. Stoll (Schweizer Achiv. für Neurolgie and Psychiatrie, volume 60, page 279, 1947). Stoll showed that LSD produced an intoxication of the acute exogenous reaction type (as classified in psychic disease) in human beings when administered by mouth at the astonishingly small dose of 20 to 30 micrograms.

G. Condrau demonstrated that schizophrenic subjects are much more resistant to the action of LSD than normal persons, and that the tolerance to LSD seemed as a rule better in psychopaths than in healthy individuals (Acta Psychiatrica et Neurologica Scandinavica, volume 24, page 9, 1949). Condrau raised the question whether psychoses might not have their etiology in the endogenous production of substances similar to LSD. Other investigators believe that LSD intoxication is an especially suitable psychosis model of schizophrenia (R. Fisher, F. Georgi, and R. Weber, Schweizerische Medizinische Wochenschrift, volume 81, page 817, 1951).

D. W. Woolley has demonstrated that LSD also produces abnoral behavior in mice (Proceedings of the National Academy of Science, volume 41, page 338, 1955). This was also demonstrated for rats by C. A. Winter and L. Flataker, who designed a bioassay for quantitation of antagonistic effects of drugs on the psychic action produced by LSD in rats (Proceedings of the Society for Experimental Biology and Medicine, volume 92, page 285, 1956). Using this bioassay, J. R. Bergen, D. Krus and G. Pincus demonstrated that certain steroid hormones and metabolites had biological activity in suppressing LSD-induced behavior changes in rats. Estradiol-17β, however, was not effective (Proceedings of the Society for Experimental Biology and Medicine, volume 105, page 254, 1960).

The compounds of this invention, while having desirable physiological properties of suppressing the undesired effects of LSD, are substantially inactive as steriod hormones.

It is an object of this invention to provide new and useful steroids which antagonize or suppress the induction of psychotic conditions by LSD in mammals. It is a further object to provide methods for producing such compounds by economical and efficient methods from readily available starting materials. It is a further object to provide novel androstane compounds having useful physiological properties. These and other objects are apparent from and are achieved in accordance with the following disclosure.

The compounds which comprise this invention can be produced from androstan-3β-ol-16-one by reaction with a suitable Grignard reagent or other organometallic compound of the formula RMg-halogen wherein R has the meaning given above, in an inert solvent such as an aliphatic ether, dioxane, tetrahydrofuran or an aliphatic hydrocarbon. By this reaction a lower hydrocarbon substituent is introduced in the 16α-position and a hydroxyl group is formed in the 16β-position. The procedure is conducted at low temperatures (15°–100° C.) with an excess of organometallic compound to insure a substantially complete reaction of the 16-keto group with the organometallic reagent. The desired steroid compound can be isolated by decomposing the reaction mixture with aqueous acid or ammonium chloride solution and removing the steroid compound from the organic phase as by extraction or evaporation.

The 3-hydroxyl group can be oxidized to a 3-oxo (keto) group by hexavalent chromium oxidizing agents such as chromium trioxide or chromic acid in acid solution or by the Oppenauer method with a high molecular weight ketone such as cyclohexanone and an aluminum alkoxide such as aluminum isopropoxide.

The invention is disclosed in further detail by means of the following examples which are provided for purposes of illustration only and are not intended to limit the invention in spirit or in scope. It will be apparent to those skilled in the art that the numerous modifications in operating conditions and reagents can be made within the scope of this disclosure without departing from the invention. Likewise, various modifications in substituents on the androstan nucleus may be made within the scope of this disclosure.

EXAMPLE 1

*16α-methylandrostan-3β,16β-diol*

16α-methyl-5-androsten-3β,16β-diol (2.45 grams), dissolved in 100 ml. of 95% ethanol, was hydrogenated in the presence of a palladium-on-charcoal catalyst (containing 1.25 grams of palladium) at 15 p.s.i.g. hydrogen pressure over a period of 3.5 hours. The catalyst was then removed by filtration and the filtrate was diluted with 50 ml. of water. The aqueous alcohol solution was evaporated until crystallization commenced, then refrigerated. The precipitate of 16α-methylandrostan-3β,16β-diol which formed was removed, washed with water and recrystallized from aqueous methanol; M.P. 198°–198.5° C. $[\alpha]_D^{23} = -1°$ (c.=1.064 in 95% ethanol).

EXAMPLE 2

*16α-methylandrostan-3β,16β-diol diacetate*

A solution of 125 mg. of 16α-methylandrostan-3β,16β-diol, 1.5 ml. of dimethylaniline and 1.5 ml. of acetyl chloride in 35 ml. of chloroform was refluxed for 4 hours. The chloroform was removed by evaporation and the residue partitioned with dilute hydrochloric acid (1:5) and ether. The ether solution was washed with water, dried and evaporated. The residue of 16α-methylandrostan-3β,16β-diol diacetate was recrystallized from aqueous methanol. It formed plates of M.P. 130°–131° C.

$$[\alpha]_D^{23} = -9°$$

(c.=0.958 in chloroform).

EXAMPLE 3

16α-methylandrostan-16β-ol-3-one

A solution of 1.40 grams of 16α-methylandrostan-3β,16β-diol in 84 ml. of acetic acid was treated with a solution of 615 mg. of chromium trioxide in 44 ml. of 90% aqueous acetic acid at a temperature of 25° C. (water bath) for 3 hours. The reaction mixture was diluted with 600 ml. of ice water and extracted with 800 ml. of ether. The ether extract was washed with water, sodium hydroxide solution (1 N) and again with water. The ether was then evaporated and the residue of 16α-methylandrostan-16β-ol-3-one was recrystallized from aqueous methanol; M.P. 138.5°–139° C., $[\alpha]_D^{27} = +13.5°$ (c.=1.032 in 95% ethanol).

EXAMPLE 4

16α-methylandrostan-16β-ol-3-one acetate

A solution of 125 mg. of 16α-methylandrostan-16β-ol-3-one, 1.5 ml. of dimethylaniline and 1.5 ml. of acetyl chloride in 35 ml. of chloroform was refluxed for 4 hours. The chloroform was then removed by evaporation and the residue was partitioned between 100 ml. of ether and 100 ml. of dilute hydrochloric acid (1:5). The ether solution was separated, washed with water and evaporated. The residue of 16α-methylandrostan-16β-ol-3-one acetate was recrystallized from aqueous methanol; M.P. 115°–116° C. $[\alpha]_D^{24} = +16°$ (c.=0.789 in chloroform).

EXAMPLE 5

16α-ethylandrostan-3β,16β-diol

To a solution of 5.6 grams of androstan-3β-ol-16-one in 1000 ml. of anhydrous ether was added, over a period of 30 minutes, 100 ml. of 3.0 molar ethylmagnesium bromide solution in anhydrous ether, the reaction mixture being maintained at reflux throughout. Refluxing was continued for 3 hours longer, then the mixture was chilled and decomposed with 250 ml. of a solution of ammonium chloride (20%). The ether layer was separated, the aqueous layer was extracted with 1 liter of ether, and the combined ether extracts were washed with ice water, dried and evaporated. The residue of 16α-ethylandrostan-3β,16β-diol was recrystallized from methanol and from acetone-petroleum ether; melting point 160°–160.5° C.

EXAMPLE 6

16α-ethylandrostan-16β-ol-3-one

A solution of 2.70 grams of 16α-androstan-3β,16β-diol in 100 ml. of acetic acid and a solution of 840 mg. of chromium trioxide in 60 ml. of 90% acetic acid were adjusted to a temperature of 25° C. in a water bath. The solutions were then mixed and maintained at 25° C. for 3 hours with occasional agitation. The reaction mixture was then diluted with 500 ml. of ice water and extracted with 1-liter and 500-ml. portions of ether. The ether extracts were combined, washed with potassium carbonate solution and with ice water and then evaporated. The residue of 16α-ethylandrostan-16β-ol-3-one was recrystallized by solution in acetone, dilution with petroleum ether, and evaporation of the acetone; M.P. 119°–120° C.

EXAMPLE 7

16α-n-propylandrostan-3β,16β-diol

A Grignard reagent was prepared from 12.15 grams of magnesium turnings covered with 100 ml. of anhydrous ether and 46 ml. of n-propyl bromide in 400 ml. of anhydrous ether. The resulting Grignard reagent was filtered through glass wool, refluxed on a steam bath and treated with a solution of 6.8 grams of androstan-3β-ol-16-one in 1200 ml. of dry ether over a period of 30 minutes. Refluxing and agitation were continued for 2 hours and then the reaction mixture was cooled in ice water and decomposed by the slow addition of 500 ml. of 3.0 N ammonium chloride solution. One liter of ether was added and the ether phase was separated, washed with ice water and evaporated. The residue of 16α-n-propylandrostan-3β,16β-diol was recrystallized from methanol and from acetone-petroleum ether; M.P. 165°–166° C.

EXAMPLE 8

16α-n-propylandrostan-16β-ol-3-one

A solution of 2.50 grams of 16α-n-propylandrostan-3β,16β-diol in 90 ml. of acetic acid and a solution of 747 mg. of chromium trioxide and 55 ml. of 90% acetic acid were adjusted to 25° C. in a water bath. The solutions were then mixed and maintained at 25° C. for 3 hours with occasional agitation. The reaction mixture was then diluted with 500 ml. of ice water and extracted with 1-liter and 500-ml. portions of ether. Ether extracts were combined, washed with potassium carbonate solution and with ice water and evaporated. The residue of 16α-n-propylandrostan-16β-ol-3-one was dissolved in acetone, treated with charcoal, diluted with petroleum ether, evaporated and crystallized; M.P. 129.5°–130.5° C.

16α-n-propylandrostan-16β-ol-3-one propionate is made by dissolving 100 mg. of 16α-n-propylandrostan-16β-ol-3-one in 40 ml. of chloroform containing 2 ml. of propionyl chloride and 1.5 ml. of dimethylaniline. The solution is refluxed for 4 hours, evaporated, and the residue partitioned between ether and dilute hydrochloric acid. The ether solution is washed and evaporated, providing the desired ester.

EXAMPLE 9

16α-allylandrostan-3β,16β-diol 11.0 grams of 5-androsten-3β-ol-16-one acetate in 175 ml. of 95% ethanol was hydrogenated in the presence of 3.0 grams of 5% palladium-on-charcoal catalyst for 6 hours at 15 p.s.i.g. The catalyst was removed by filtration, washed with ethanol and the filtrate diluted with 200 ml. of water, evaporated until crystallization began and then refrigerated. The androstan-3β-ol-16-one acetate was recrystallized from 80% methanol and melted at 104°–105° C.

A Grignard reagent prepared from 18.2 grams of magnesium turnings covered with 200 ml. of anhydrous ether and 65 ml. of allyl bromide in 800 ml. of anhydrous ether was treated with a solution of 9.5 grams of androstan-3β-ol-16-one acetate in 500 ml. of anhydrous ether over a period of 30 minutes while maintained at a temperature of 0°–2° C. with agitation. After the steroid was added stirring was continued for 3 hours and the reaction mixture left over-night and allowed to rise to room temperature. The reaction mixture was cooled in an ice bath and decomposed with 1500 ml. of 2.0 N ammonium chloride solution. The reaction mixture was filtered through glass wool and diluted with 500 ml. of ether. The ether phase was removed and the aqueous phase extracted with 1 liter of ether. The combined ether solutions were washed with ice water and evaporated. The residue of 16α-allylandrostan-3β,16β-diol was recrystallized from methanol; M.P. 112°–113° C.

EXAMPLE 10

16α-allylandrostan-16β-ol-3-one

A solution of 5.0 grams of 16α-allylandrostan-3β,16β-diol in 500 ml. of toluene and 200 ml. of cyclohexanone was distilled until 200 ml. of solvent was removed. To the residual solution was added 5.0 grams of aluminum isopropoxide and the reaction mixture was heated to reflux for 75 minutes. It was then cooled, decomposed with a solution of 5 ml. of acetic acid in 50 ml. of water and steam distilled to remove solvents. The residue was partitioned between 800 ml. of 3.0 N sulfuric acid and 1500 ml. of ether. The ether phase was separated, washed with ice water and evaporated. The residue of 16α-allylandrostan-16β-ol-3-one was dissolved in acetone, the acetone solution was diluted with an equal volume of petroleum ether (heptane) and the solution evaporated until the acetone was removed. The steroid which crystallized from the solution melted at 118°–118.5° C.

EXAMPLE 11

16α-ethynylandrostan-3β,16β-diol

A solution of 8.0 grams of 5-androsten-3β-ol-16-one was hydrogenated in 250 ml. of 95% ethanol in the presence of 1.6 grams of 5% palladium on charcoal catalysts at 18 p.s.i.g. The catalyst was removed by filtration, the filtrate was diluted with 250 ml. of water and evaporated until crystallization began. The mixture was then chilled to 0° C. and the residue of androstan-3β-ol-16-one was removed and recrystallized from aqueous methanol; M.P. 181°–183° C.

A solution of 6.5 grams of potassium in 160 ml. of tertiary-butyl alcohol was prepared by stirring and refluxing the mixture. It was cooled to 0° C. while protected from moisture and acetylene gas was passed therethrough for 30 minutes. A solution of 6.2 grams of androstan-3β-ol-16-one in 325 ml. of anhydrous ethylene glycol dimethyl ether was added. Acetylene was passed through the reaction mixture for 8 hours at 0° C. with good agitation. Then 600 ml. of ice water was added and the reaction mixture poured into 6 liters of ice water containing 200 grams of sodium chloride. The precipitate of impure 16α-ethynylandrostan-3β,16β-diol was removed by filtration, washed with water, dissolved in 250 ml. of n-propyl alcohol and admixed with a solution of 6.0 grams of aminoxyacetic acid hemihydrochloride (carboxymethoxyamine hemihydrochloride) and 9.0 grams of potassium acetate in 100 ml. of water. The reaction mixture was heated to reflux for 2 hours, cooled in an ice bath and extracted with 1500 ml. of ether. The ether solution containing the 16α-ethynylandrostan-3β,16β-diol was washed five times with 200 ml. portions of 0.5 N-sodium hydroxide solution and with ice water until neutrality. The ether solution was evaporated and the residue of 16α-ethynylandrostan-3β,16β-diol was recrystallized from methanol, then dissolved in acetone and displaced with petroleum ether by evaporation. The purified product melted at 235°–235.5° C.

EXAMPLE 12

16α-ethynylandrostan-16β-ol-3-one

To a stirred solution of 300 mg. of 16α-ethynylandrostan-3β,16β-diol in 80 ml. of ether was added a solution of chromic acid prepared by dissolving 5.00 grams of sodium dichromate dihydrate in 3.75 ml. of 96% sulfuric acid and diluting to a volume of 25 ml. with water. The reaction mixture was stirred at 25° C. for 15 minutes and allowed to stand at room temperature for 1 hour. The ether layer was separated and the aqueous phase extracted with ether. The combined ether extracts were washed with water, sodium bicarbonate solution and again with water and then dried and evaporated. The residue of 16α-ethynylandrostan-16β-ol-3-one was dissolved in anhydrous pyridine, treated with 0.3 gram of succinic anhydride and heated at reflux for 4 hours. The reaction mixture was diluted with water, heated for 30 minutes, cooled and partitioned with 100 ml. of ether. The ether solution was washed with dilute sulfuric acid, water, dilute potassium carbonate solution and water, then dried and evaporated. The residue of 16α-ethynylandrostan-16β-ol-3-one was recrystallized from aqueous methanol, dissolved in acetone and the acetone displaced with heptane by distillation. On chilling of the heptane solution, crystalline 16α-ethynylandrostan-16β-ol-3-one was obtained of M.P. 180°–181° C.

I claim:

1. A compound selected from the group consisting of a steroid of the formula

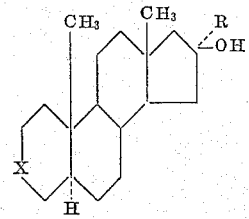

and lower alkanoic acid esters thereof, wherein X is selected from the group consisting of carbonyl and hydroxymethylene and R is lower hydrocarbon containing 1 to 5 carbon atoms.

2. 16α-methylandrostan-3β,16β-diol.
3. 16α-methylandrostan-3β,16β-diol diacetate.
4. 16α-methylandrostan-16β-ol-3-one.
5. 16α-methylandrostan-16β-ol-3-one acetate.
6. 16α-ethylandrostan-3β,16β-diol.
7. 16α-ethylandrostan-16β-ol-3-one.
8. 16α-n-propylandrostan-3β,16β-diol.
9. 16α-n-propylandrostan-16β-ol-3-one.
10. 16α-allylandrostan-3β,16β-diol.
11. 16α-allylandrostan-16β-ol-3-one.
12. 16α-ethynylandrostan-3β,16β-diol.
13. 16α-ethynylandrostan-16β-ol-3-one.

References Cited in the file of this patent

UNITED STATES PATENTS

| | | |
|---|---|---|
| 2,949,476 | Tyner | Aug. 16, 1960 |
| 3,081,316 | Sakakibara et al. | Mar. 12, 1963 |
| 3,097,199 | Bowers | July 9, 1963 |